US010106077B2

(12) United States Patent
Terrier et al.

(10) Patent No.: US 10,106,077 B2
(45) Date of Patent: Oct. 23, 2018

(54) DEVICE FOR MANAGING LIGHTING IN A ROOM OF A PUBLIC TRANSPORT VEHICLE, IN PARTICULAR A RAILWAY VEHICLE

(71) Applicant: ALSTOM TRANSPORT TECHNOLOGIES, Saint-Ouen (FR)

(72) Inventors: Jean-Luc Terrier, Saint Saulve (FR); Jean Le-Bastard, Versailles (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/446,698

(22) Filed: Mar. 1, 2017

(65) Prior Publication Data

US 2017/0259735 A1    Sep. 14, 2017

(30) Foreign Application Priority Data

Mar. 8, 2016    (FR) ...................................... 16 51926

(51) Int. Cl.
*B60Q 3/47*  (2017.01)
*B61D 29/00*  (2006.01)
*B61D 1/00*  (2006.01)
*F21V 23/04*  (2006.01)
*B60Q 3/43*  (2017.01)
(Continued)

(52) U.S. Cl.
CPC ............... *B60Q 3/47* (2017.02); *B61D 29/00* (2013.01); *B60Q 3/43* (2017.02); *B60Q 3/44* (2017.02); *B61D 1/00* (2013.01); *F21V 23/0464* (2013.01); *F21V 23/0478* (2013.01); *F21W 2106/00* (2018.01)

(58) Field of Classification Search
CPC ... B60Q 3/20; B60Q 3/30; B60Q 3/40; B60Q 3/47; B60Q 3/51; B60Q 3/74; B60Q 3/76; B60Q 3/80; B60Q 3/233; B61D 29/00; B64D 11/00
See application file for complete search history.

(56) References Cited

U.S. PATENT DOCUMENTS 9,245,443 B2 *  1/2016  Ibrahim ................. G08C 23/04
9,457,907 B2 *  10/2016  Brown .................... B64D 13/00
(Continued)

FOREIGN PATENT DOCUMENTS

DE    102012006694 A1    10/2013
DE    102012011691 A1    12/2013
(Continued)

OTHER PUBLICATIONS

Preliminary Search Report for FR 1651926 dated Nov. 18, 2016.

*Primary Examiner* — Thai Pham
(74) *Attorney, Agent, or Firm* — Thompson Coburn LLP; Steven M. Ritchey

(57) ABSTRACT

The lighting management device comprises a variable lighting system which includes: at least one exterior light sensor, that is capable of measuring the characteristics of the exterior light outside the vehicle, and at least one interior image capture device, that is capable of capturing images within the interior of the compartment; and a control unit for controlling the lighting system, configured so as to adjust the lighting in the compartment based on the brightness of the exterior light measured outside the vehicle and the images captured within the interior of the compartment.

11 Claims, 1 Drawing Sheet

(51) Int. Cl.
*B60Q 3/44* (2017.01)
*F21W 106/00* (2018.01)

(56) References Cited

U.S. PATENT DOCUMENTS

| | | | | |
|---|---|---|---|---|
| 2006/0261970 A1* | 11/2006 | Colacecchi | ............ | B64D 11/00 340/686.1 |
| 2008/0112175 A1* | 5/2008 | Bucher | .................... | B60Q 3/74 362/490 |
| 2011/0166751 A1* | 7/2011 | Bauer | .................... | B64D 11/00 701/49 |
| 2017/0073074 A1* | 3/2017 | Gagnon | ................. | B64D 11/00 |

FOREIGN PATENT DOCUMENTS

| | | |
|---|---|---|
| DE | 102012017276 A1 | 3/2014 |
| DE | 102013019210 A1 | 5/2015 |
| WO | 2015/130571 A1 | 9/2015 |

\* cited by examiner

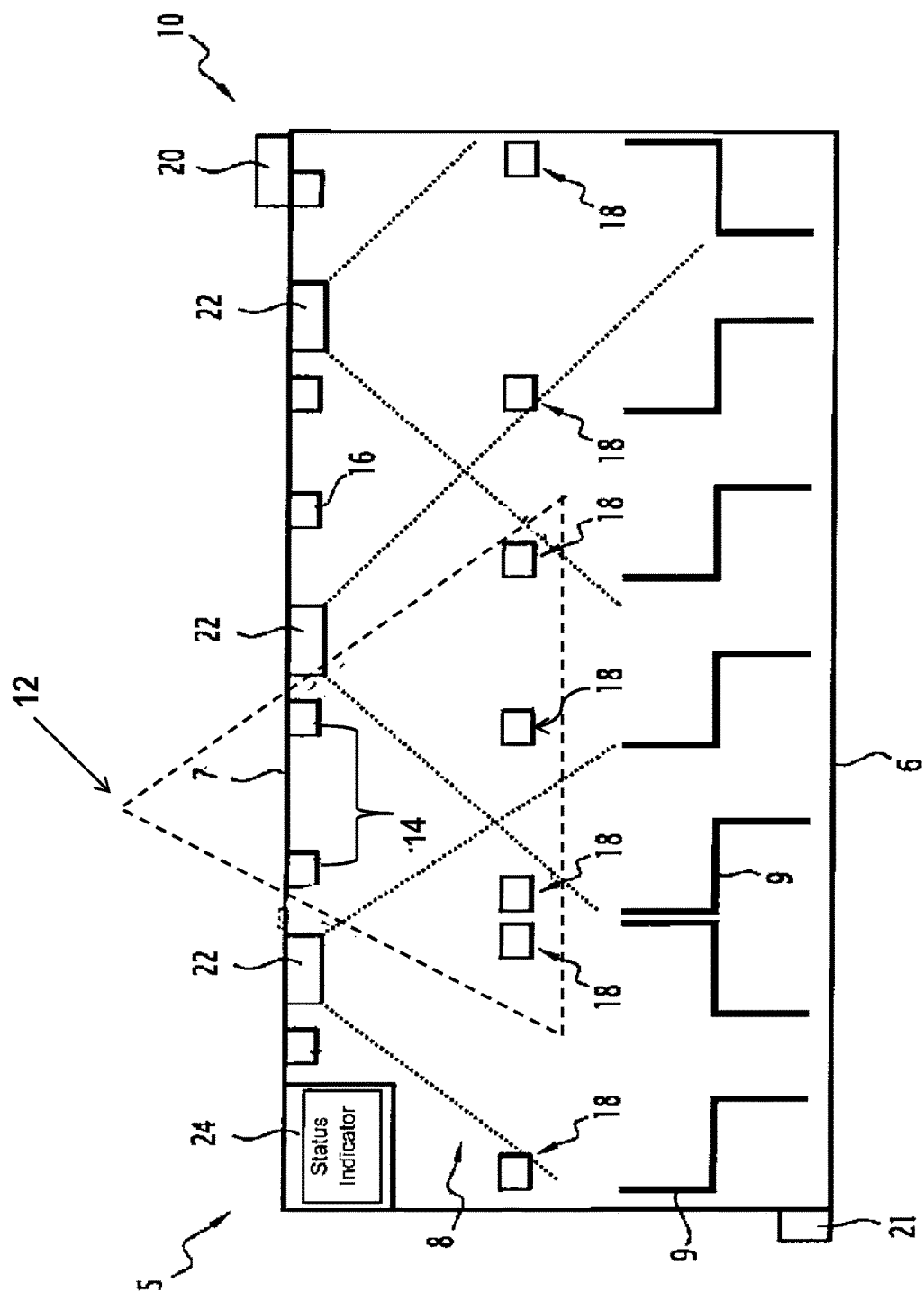

DEVICE FOR MANAGING LIGHTING IN A ROOM OF A PUBLIC TRANSPORT VEHICLE, IN PARTICULAR A RAILWAY VEHICLE

CROSS-REFERENCE AND PRIORITY CLAIM TO RELATED PATENT APPLICATION

This patent application claims priority to French Patent Application FR 16 51926, filed Mar. 8, 2016, the entire disclosure of which is incorporated herein by reference.

INTRODUCTION

The present invention relates to a lighting management device for managing the lighting in a room or compartment of a public transport vehicle, in particular a railway vehicle.

We know already, in the state of the art, a lighting management device for managing the lighting in a compartment of a railway vehicle, that comprises a variable lighting system arranged in the compartment.

The lighting system may be set in several configurations, generally manually, and in particular a day-time configuration and a night-time configuration, for which the brightness (luminosity) is different. The lighting system generally also includes individual lighting devices, that present only 'switched on' or 'switched off' configurations.

The object of the invention is to improve the situation by providing a lighting management device that makes it possible to ensure better adjustment of the lighting, and to do so in an automatic manner.

To this end, the object of the invention relates to a lighting management device for managing the lighting in a compartment of a public transport vehicle, in particular a railway vehicle, that comprises a variable lighting system arranged in the compartment, characterized in that it includes:
- at least one exterior light sensor, that is capable of measuring the characteristics of the exterior light outside the vehicle, and at least one interior image capture device, that is capable of capturing images within the interior of the compartment; and
- a control unit for controlling the lighting system, configured so as to adjust the lighting in the compartment based on the brightness of the exterior light measured outside the vehicle and the images captured within the interior of the compartment.

The device according to the invention takes into account both the exterior lighting on the one hand, and the presence as well as the activity of the passengers on the other hand, in order to obtain an interior lighting that is optimized on the basis of the situation.

A lighting management device according to the invention may additionally also include one or more of the following characteristic technical features, taken into consideration alone or in accordance with all technically possible combinations:
- the lighting system includes an overall lighting device for general overall lighting of the compartment;
- the lighting system includes a plurality of individual lighting devices, each being arranged in the proximity of a seat arranged in the compartment;
- the control unit is configured in order to control each individual lighting device based on the presence and activity of a passenger seated in the corresponding seat;
- the lighting management device includes the status indication means for indicating the status of a vehicle, the status being chosen for example among: present in a train station; at a halt outside a train station; at the depot; and in motion; and
- the control unit is configured in order to control the lighting system based on the status of the vehicle.

The object of the invention also relates to a lighting management method for managing the lighting in a compartment of a public transport vehicle, in particular a railway vehicle, by means of a lighting management device as defined previously, characterized in that it includes:
- a light measurement and image capture step for measuring the characteristics of the exterior light outside the vehicle, and capturing of images within the interior of the compartment, and
- a lighting adjustment step for adjusting the lighting in the compartment based on the brightness of the exterior light measured outside the vehicle and the images captured within the interior of the compartment.

A lighting management method according to the invention may additionally also include one or more of the following characteristic technical features, taken into consideration alone or in accordance with all technically possible combinations:
- the method includes an image analysis step for analyzing the images captured in order to make a determination as to the presence and activity of at least one passenger, the adjustment of the lighting being performed on the basis of the said presence and activity determined; and
- the adjustment of the lighting includes modification of the intensity of the lighting, and/or its color and/or its white color temperature.

The invention will be better understood upon reading the description that follows, provided only by way of an example and with reference being made to the annexed FIGURE that schematically represents a public transport vehicle compartment, equipped with a lighting management device according to an example of the embodiment of the invention.

BRIEF DESCRIPTION OF THE DRAWING

The accompanying drawing, which is incorporated in and forms part of the specification, illustrates the disclosed embodiments and together with the description, serves to explain certain inventive principles.

The FIGURE included with this application shows an interior view of coach compartment used with a public transport vehicle.

DETAILED DESCRIPTION OF EXAMPLE EMBODIMENTS

Represented in the FIGURE is a compartment 5 of a coach of a public transport vehicle, in particular a railway vehicle.

The compartment 5 contains a floor 6 and a ceiling 7 that delimits height-wise one accommodation space 8 for accommodating passengers. The seats 9 are arranged in this accommodation space 8, with each seat 9 being designed to accommodate one passenger.

The compartment 5 is equipped with a lighting management device 10 for managing the lighting in a compartment 5, that comprises a variable lighting system 12 arranged in the compartment 5.

The lighting system 12 according to the invention is variable based on several parameters, in particular the intensity, the color, and the color temperature of the lighting.

The lighting system 12 advantageously includes an overall lighting device 14 for general overall lighting of the compartment 5, which includes a plurality of light fixtures 16 arranged in the ceiling 7 of the compartment 5, or in the proximity of this ceiling 7. The general overall lighting device 14 is designed to diffuse the light all over in the compartment 5.

The lighting system 12 advantageously also includes a plurality of individual lighting devices 18, each being arranged in the proximity of one of the seats 9, in particular over this seat 9. Each individual lighting device 18 is intended to diffuse light only towards the corresponding seat 9, so as to adjust the lighting at the level of each passenger.

The lighting management device 10 includes at least one exterior light sensor 20, which is capable of measuring the characteristics of the exterior light outside the vehicle. These characteristics of the light are for example the light intensity, white color temperature, and the orientation of the light.

For example, the light intensity is measured in lumens, by means of a light meter of a conventional type.

Advantageously, the lighting management device 10 includes in addition a front exterior light sensor 21, turned towards the front of the vehicle, in order to predict exterior light variations due to the advancing of the vehicle.

The lighting management device 10 in addition includes at least one interior image capture device 22, which is capable of capturing images within the interior of the compartment.

The lighting management device 10 also includes a lighting control unit 24 for controlling the lighting system 12, configured so as to adjust the lighting in the compartment 5 based on the brightness of the exterior light measured outside the vehicle and the images captured within the interior of the compartment 5.

More particularly, the control unit 24 controls the general overall lighting device 14 in particular, based on the characteristics of the outside light measured on the exterior by the exterior light sensor 20.

For example, in the event of the exterior light being very bright, the overall lighting device 14 may be turned off. In the event of the exterior light being moderately bright or dim, the general overall lighting device 14 emits high intensity lighting. In the event of there being almost no exterior light, that is to say, during the night, the general overall lighting device 14 emits low intensity lighting.

The front exterior light sensor also makes it possible to anticipate the passage of the vehicle through a tunnel, which provides the ability to differentiate between the conditions of passage through a tunnel and night time. In the case of the passage through a tunnel, it is possible to provide for adjusting the general overall lighting device 14 so as to ensure that the lighting within the interior of the compartment 5 remains substantially the same between the exterior of the tunnel and the interior of the tunnel.

Advantageously, the control unit 24 takes into account the orientation of the exterior light, in a manner such that the overall lighting system emits light of greater intensity in the shaded zones to compensate for this shade. Thus, one side of the compartment 5, which is exposed to the sun, is lit with lower luminosity than the other side of the compartment 5, which is under the cover of shade.

The control unit 24 also includes the image analysis means for analyzing the images captured, thereby making it possible to infer, from the captured images, the presence of passengers on the seats 9 and the activity of these passengers.

The presence of a passenger on a seat 9 is determined in a conventional manner, for example by comparing an image of the unoccupied seat 9 with the image captured.

As for the activity of the passenger, this is determined by detecting certain predefined forms, and/or by detecting movements. By way of example, by detecting a screen that is turned on, it could be deduced therefrom that the passenger is watching a movie or working on a computer. In detecting a rectangular shaped form, it could be deduced therefrom that the passenger is reading a book. Without detection of any particular form, but by detecting movements, it could be deduced therefrom that the passenger is active. Without detection of any particular form, and without detection of any movements, it could be deduced therefrom that the passenger is sleeping.

The control unit 24 is configured in order to control each individual lighting device 18 based on the presence and activity of a passenger on the corresponding seat 9.

For example, when no passenger is present on the seat 9, the individual lighting device 18 associated with this seat 9 is turned off. If the image analysis means have determined that a passenger present in the seat 9 is consulting their computer, the individual lighting device 18 associated with this seat 9 then emits lighting of moderate intensity. If the image analysis means have determined that a passenger present in the seat 9 is reading a book, the individual lighting device 18 associated with this seat 9 then emits a high intensity lighting. If the image analysis means have determined that a passenger present in the seat 9 is active, with no book, the individual lighting device 18 associated with this seat 9 then emits a medium intensity lighting. If the image analysis means have determined that a passenger present in the seat 9 is sleeping, the individual lighting device 18 associated with this seat 9 then emits a light of low intensity or null intensity.

Other parameters may be taken into account for the adjustment of the lighting in the compartment 5.

For example, the lighting management device 10 includes the status indication means for indicating the status of a vehicle, the status being chosen from the following: present in a train station; at a halt outside a train station; at the depot; and in motion. The control unit 24 is thus then configured in order to control the lighting system 12 based on the status of the vehicle.

A specific lighting may thus be diffused when the train is in the station. For example, at the terminus, all of the lights may be turned on at high intensity, with white light.

At the depot, all of the lights may be turned off, since no passenger is supposed to present be in the compartment 5.

It is also possible to provide for lighting of varying intensity and/or different colors based on the status of the train, at a halt or in motion.

It is clearly apparent that the lighting management device 10 according to the invention provides the ability to automatically modify the lighting ambience in the compartment 5 based on various different parameters defined previously, in order to maintain at all times the level of visual comfort for passengers. This automatic modification is carried out in real time, based on the evolving state of the said parameters.

It should be noted that certain parameters may be considered on a prioritized basis as compared to others. For example, the status of the vehicle may be considered first and foremost, the other parameters being taken into consideration only when the vehicle is in motion.

The lighting management device 10 according to the invention makes it possible to operationally implement a lighting management method, which includes:

a light measurement and image capture step for measuring the characteristics of the exterior light outside the vehicle, and capturing of images within the interior of the compartment; and a lighting adjustment step for adjusting the lighting in the compartment based on the brightness of the exterior light measured outside the vehicle and the images captured within the interior of the compartment.

The lighting management method includes an image analysis step for analyzing the images captured in order to make a determination as to the presence and activity of at least one passenger, the adjustment of the lighting being performed on the basis of the said presence and activity determined.

Advantageously, the adjustment of the lighting includes modification of the intensity of the lighting, and/or its color and/or its white color temperature.

It is to be noted that the invention is not limited to the previously described embodiment, but could present various additional variant embodiments.

The invention claimed is:

1. A lighting management device for managing a lighting in a compartment of a public transport vehicle, the lighting management device comprising:
   a variable lighting system arranged in the compartment, wherein the variable lighting system comprises:
      at least one exterior light sensor located outside the compartment of the public transport vehicle and capable of measuring characteristics of an exterior light outside the public transport vehicle; and
      at least one interior image capture device located inside the compartment of the public transport vehicle and capable of capturing images within an interior of the compartment; and
   a control unit for controlling the variable lighting system, wherein the control unit is configured to adjust the lighting in the compartment of the public transport vehicle based on a brightness of the exterior light measured outside the compartment of the public transport vehicle and the images captured within the interior of the compartment of the public transport vehicle.

2. The lighting management device according to claim 1, wherein the variable lighting system further comprises an overall lighting device for general overall lighting of the compartment.

3. The lighting management device according to claim 1, wherein the variable lighting system further comprises a plurality of individual lighting devices, each being arranged in the proximity of a seat arranged in the compartment.

4. The lighting management device according to claim 3, wherein the control unit is configured to control each individual lighting device based on the presence and activity of a respective passenger seated in the corresponding seat.

5. The lighting management device according to claim 1 further comprising a status indicator within the control unit for indicating a status of a vehicle.

6. The lighting management device according to claim 5, wherein the status of the vehicle is selected from the group consisting of the vehicle present in a train station, the vehicle at a halt outside a train station, the vehicle at a depot, and the vehicle currently being in motion.

7. The lighting management device according to claim 5, wherein the control unit is configured to control the variable lighting system based on the status of the vehicle.

8. A lighting management method for managing the lighting in a compartment of a public transport vehicle using a lightning management device that comprises:
   a variable lighting system arranged in the compartment, wherein the variable lighting system comprises:
      at least one exterior light sensor located outside the compartment of the public transport vehicle and capable of measuring characteristics of an exterior light outside the public transport vehicle; and
      at least one interior image capture device located inside the compartment of the public transport vehicle and capable of capturing images within an interior of the compartment; and
   a control unit for controlling the variable lighting system, wherein the control unit is configured to adjust the lighting in the compartment of the public transport vehicle based on a brightness of the exterior light measured outside the compartment of the public transport vehicle and the images captured within the interior of the compartment of the public transport vehicle;
the lighting management method comprising:
   measuring at least one characteristic of the exterior light outside the public transport vehicle with the at least one exterior light sensor, wherein the at least one characteristic is brightness;
   capturing images within the interior of the compartment of the public transport vehicle with the at least one interior image capture device; and
   adjusting the lighting in the compartment based on the brightness of the exterior light measured outside the public transport vehicle and the images captured within the interior of the compartment of the public transport vehicle.

9. The lighting management method according to claim 8, wherein the method further comprises analyzing the images captured within the interior of the compartment to make a determination regarding the presence and activity of at least one passenger; and
   wherein the adjusting of the lighting in the compartment is further based on the determination regarding the presence and activity of at least one passenger.

10. The lighting management method according to claim 8, wherein the adjusting of the lighting in the compartment comprises modifying at least one of the following aspects of the lighting: intensity, color, and white color temperature.

11. A public transport vehicle comprising:
   a compartment; and
   a lighting management device for managing lighting in the compartment, the lighting management device comprising a variable lighting system arranged in the compartment, wherein the lighting management device includes:
      at least one exterior light sensor located outside the compartment of the public transport vehicle and capable of measuring characteristics of an exterior light outside the public transport vehicle;
      at least one interior image capture device located inside the compartment of the public transport vehicle and capable of capturing images within an interior of the compartment;
      a control unit for controlling the variable lighting system, wherein the control unit is configured to adjust the lighting in the compartment of the public transport vehicle based on a brightness of the exterior light measured outside the compartment of the public transport vehicle and the images captured within the interior of the compartment of the public transport vehicle; and wherein the exterior light sensor is turned towards a front of a vehicle, in order to predict exterior light variations due to the advancing of the vehicle.

* * * * *